US007080688B2

(12) United States Patent
Todd et al.

(10) Patent No.: US 7,080,688 B2
(45) Date of Patent: Jul. 25, 2006

(54) COMPOSITIONS AND METHODS FOR DEGRADING FILTER CAKE

(75) Inventors: Bradley L. Todd, Duncan, OK (US); Ronald J. Powell, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 165 days.

(21) Appl. No.: 10/641,242

(22) Filed: Aug. 14, 2003

(65) Prior Publication Data

US 2005/0034865 A1 Feb. 17, 2005

(51) Int. Cl.
*E21B 37/00* (2006.01)
*E21B 43/04* (2006.01)
*E21B 43/267* (2006.01)

(52) U.S. Cl. .................. 166/278; 166/280.2; 166/300; 166/307; 166/312; 507/260; 507/267; 507/924; 507/927

(58) Field of Classification Search ................ 166/278, 166/276, 304, 300, 311, 312, 280.2, 291, 166/307; 507/260, 267, 924, 927
See application file for complete search history.

(56) References Cited

U.S. PATENT DOCUMENTS

| 2,238,671 A | 4/1941 | Woodhouse .................. 166/21 |
| 2,703,316 A | 3/1955 | Palmer ...................... 260/78.3 |
| 3,173,484 A | 3/1965 | Huitt et al. |
| 3,195,635 A | 7/1965 | Fast |
| 3,272,650 A | 9/1966 | MacVittie ...................... 134/7 |
| 3,302,719 A | 2/1967 | Fischer |
| 3,364,995 A | 1/1968 | Atkins et al. |
| 3,366,178 A | 1/1968 | Malone et al. |
| 3,455,390 A | 7/1969 | Gallus |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |
| 3,868,998 A | 3/1975 | Lybarger et al. ............ 166/278 |
| 3,912,692 A | 10/1975 | Casey et al. ............... 260/78.3 |
| 3,948,672 A | 4/1976 | Harnsberger ................. 106/90 |
| 3,955,993 A | 5/1976 | Curtice ........................ 106/90 |
| 3,960,736 A | 6/1976 | Free et al. ............. 252/8.55 R |
| 3,968,840 A | 7/1976 | Tate |
| 3,998,272 A | 12/1976 | Maly .......................... 166/281 |
| 3,998,744 A | 12/1976 | Arnold et al. |
| 4,068,718 A | 1/1978 | Cooke, Jr. et al. |
| 4,169,798 A | 10/1979 | DeMartino ............. 252/8.55 R |
| 4,172,066 A | 10/1979 | Zweigle et al. ........ 260/26.6 TA |
| 4,261,421 A | 4/1981 | Watanabe .................... 166/281 |
| 4,387,769 A | 6/1983 | Erbstoesser et al. ........ 166/295 |
| 4,460,052 A | 7/1984 | Gockel .......................... 175/72 |
| 4,470,915 A | 9/1984 | Conway ................. 252/8.55 R |
| 4,498,995 A | 2/1985 | Gockel .................. 252/8.5 LC |
| 4,526,695 A | 7/1985 | Erbstoesser et al. ... 252/8.55 R |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ........ 166/284 |
| 4,785,884 A | 11/1988 | Armbruster ................. 166/280 |
| 4,797,262 A | 1/1989 | Dewitz ........................ 422/142 |
| 4,809,783 A | 3/1989 | Hollenbeck et al. ........ 166/307 |
| 4,817,721 A | 4/1989 | Pober .......................... 166/295 |
| 4,843,118 A | 6/1989 | Lai et al. ..................... 524/555 |
| 4,848,467 A | 7/1989 | Cantu et al. ................. 166/281 |
| 4,886,354 A | 12/1989 | Welch et al. .................. 356/70 |
| 4,957,165 A | 9/1990 | Cantu et al. ................. 166/295 |
| 4,961,466 A | 10/1990 | Himes et al. ................ 166/250 |
| 4,986,353 A | 1/1991 | Clark et al. .................. 166/279 |
| 4,986,354 A | 1/1991 | Cantu et al. ................. 166/279 |
| 4,986,355 A | 1/1991 | Casad et al. ................. 166/295 |
| 5,082,056 A | 1/1992 | Tackett, Jr. .................. 166/295 |
| 5,142,023 A | 8/1992 | Gruber et al. ............. 528/354 |
| 5,216,050 A | 6/1993 | Sinclair ...................... 524/108 |
| 5,247,059 A | 9/1993 | Gruber et al. ............. 528/354 |
| 5,249,628 A | 10/1993 | Surjaatmadja ............... 166/305 |
| 5,295,542 A | 3/1994 | Cole et al. ................... 166/278 |
| 5,325,923 A | 7/1994 | Surjaatmadja et al. ...... 166/308 |
| 5,330,005 A | 7/1994 | Card et al. .................. 166/280 |
| 5,359,026 A | 10/1994 | Gruber ........................ 528/354 |
| 5,360,068 A | 11/1994 | Sprunt et al. ................ 166/259 |
| 5,363,916 A | 11/1994 | Himes et al. ................ 166/276 |
| 5,373,901 A | 12/1994 | Norman et al. ............. 166/300 |
| 5,386,874 A | 2/1995 | Laramay et al. ............ 166/300 |
| 5,396,957 A | 3/1995 | Surjaatmadja et al. ...... 166/308 |
| 5,402,846 A | 4/1995 | Jennings, Jr. et al. ....... 166/259 |
| 5,439,055 A | 8/1995 | Card et al. .................. 166/280 |
| 5,460,226 A | 10/1995 | Lawson et al. ............. 166/300 |
| 5,464,060 A | 11/1995 | Hale et al. ................... 166/293 |
| 5,475,080 A | 12/1995 | Gruber et al. ............. 528/354 |

(Continued)

FOREIGN PATENT DOCUMENTS

EP 0 510 762 A2 4/1992

(Continued)

OTHER PUBLICATIONS

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Ploymer Science, vol. 157, 2002.

(Continued)

*Primary Examiner*—George Suchfield
(74) *Attorney, Agent, or Firm*—Robert A. Kent; Baker Botts

(57) ABSTRACT

Improved methods and compositions for degrading filter cake deposited in a subterranean formation are provided. These methods and compositions utilize particulates coated with acid-releasing degradable material wherein the released acid is used to degrade a filter cake.

19 Claims, No Drawings

U.S. PATENT DOCUMENTS

| | | | | |
|---|---|---|---|---|
| 5,484,881 | A | 1/1996 | Gruber et al. | 528/354 |
| 5,492,177 | A * | 2/1996 | Yeh et al. | 166/295 |
| 5,497,830 | A | 3/1996 | Boles et al. | 166/300 |
| 5,499,678 | A | 3/1996 | Surjaatmadja et al. | 166/298 |
| 5,505,787 | A | 4/1996 | Yamaguchi | 134/4 |
| 5,512,071 | A | 4/1996 | Yam et al. | 51/307 |
| 5,536,807 | A | 7/1996 | Gruber et al. | 528/354 |
| 5,591,700 | A | 1/1997 | Harris et al. | 507/204 |
| 5,594,095 | A | 1/1997 | Gruber et al. | 528/354 |
| 5,604,186 | A | 2/1997 | Hunt et al. | 507/204 |
| 5,607,905 | A | 3/1997 | Dobson, Jr. et al. | 507/211 |
| 5,670,473 | A | 9/1997 | Scepanski | 510/445 |
| 5,698,322 | A | 12/1997 | Tsai et al. | 428/373 |
| 5,765,642 | A | 6/1998 | Surjaatmadja | 166/297 |
| 5,791,415 | A | 8/1998 | Nguyen et al. | 166/280 |
| 5,833,000 | A | 11/1998 | Weaver et al. | 166/276 |
| 5,849,401 | A | 12/1998 | El-Afandi et al. | 428/215 |
| 5,853,048 | A | 12/1998 | Weaver et al. | 166/279 |
| 5,893,416 | A | 4/1999 | Read | 166/304 |
| 5,908,073 | A | 6/1999 | Nguyen et al. | 166/276 |
| 5,924,488 | A | 7/1999 | Nguyen et al. | 166/280 |
| 5,964,291 | A | 10/1999 | Bourne et al. | 166/279 |
| 6,004,400 | A | 12/1999 | Bishop et al. | 134/2 |
| 6,024,170 | A | 2/2000 | McCabe et al. | 166/300 |
| 6,028,113 | A | 2/2000 | Scepanski | 514/643 |
| 6,047,772 | A | 4/2000 | Weaver et al. | 166/276 |
| 6,114,410 | A | 9/2000 | Betzold | 523/130 |
| 6,123,965 | A | 9/2000 | Jacob et al. | 424/489 |
| 6,131,661 | A | 10/2000 | Conner et al. | |
| 6,135,987 | A | 10/2000 | Tsai et al. | 604/365 |
| 6,143,698 | A | 11/2000 | Murphey et al. | |
| 6,162,766 | A | 12/2000 | Muir et al. | 507/267 |
| 6,169,058 | B1 | 1/2001 | Le et al. | 507/222 |
| 6,172,011 | B1 | 1/2001 | Card et al. | 507/204 |
| 6,189,615 | B1 | 2/2001 | Sydansk | 166/270 |
| 6,202,751 | B1 | 3/2001 | Chatterji et al. | 166/276 |
| 6,209,643 | B1 * | 4/2001 | Nguyen et al. | 166/276 |
| 6,209,646 | B1 | 4/2001 | Reddy et al. | 166/300 |
| 6,214,773 | B1 | 4/2001 | Harris et al. | 507/271 |
| 6,242,390 | B1 | 6/2001 | Mitchell et al. | 507/211 |
| 6,260,622 | B1 | 7/2001 | Blok et al. | 166/305.1 |
| 6,311,773 | B1 | 11/2001 | Todd et al. | 166/280 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,357,527 | B1 | 3/2002 | Norman et al. | 166/300 |
| 6,364,945 | B1 | 4/2002 | Chatterji et al. | 106/677 |
| 6,380,138 | B1 | 4/2002 | Ischy et al. | 507/204 |
| 6,387,986 | B1 | 5/2002 | Moradi-Araghi et al. | 523/211 |
| 6,390,195 | B1 | 5/2002 | Nguyen et al. | 166/276 |
| 6,394,185 | B1 | 5/2002 | Constien | 166/296 |
| 6,422,314 | B1 | 7/2002 | Todd et al. | 166/312 |
| 6,454,003 | B1 | 9/2002 | Chang et al. | 166/270 |
| 6,485,947 | B1 | 11/2002 | Rajgarhia et al. | 435/139 |
| 6,488,763 | B1 | 12/2002 | Brothers et al. | 106/692 |
| 6,494,263 | B1 | 12/2002 | Todd | 166/312 |
| 6,508,305 | B1 | 1/2003 | Brannon et al. | 166/293 |
| 6,527,051 | B1 | 3/2003 | Reddy et al. | 166/300 |
| 6,554,071 | B1 | 4/2003 | Reddy et al. | 166/293 |
| 6,569,814 | B1 | 5/2003 | Brady et al. | 507/201 |
| 6,599,863 | B1 | 7/2003 | Palmer et al. | 507/219 |
| 6,667,279 | B1 | 12/2003 | Hessert et al. | 507/225 |
| 6,669,771 | B1 | 12/2003 | Tokiwa et al. | 106/162 |
| 6,681,856 | B1 | 1/2004 | Chatterji et al. | 166/294 |
| 6,686,328 | B1 | 2/2004 | Binder | 510/446 |
| 6,702,023 | B1 | 3/2004 | Harris et al. | 166/307 |
| 6,710,019 | B1 | 3/2004 | Sawdon et al. | 507/136 |
| 6,761,218 | B1 | 7/2004 | Nguyen et al. | 166/278 |
| 6,763,888 | B1 | 7/2004 | Harris et al. | 166/305.1 |
| 6,817,414 | B1 | 11/2004 | Lee | 166/278 |
| 6,896,058 | B1 | 5/2005 | Munoz, Jr. et al. | 166/279 |
| 6,949,491 | B1 | 9/2005 | Cooke, Jr. | 507/219 |
| 2001/0016562 | A1 | 8/2001 | Muir et al. | 507/201 |
| 2002/0036088 | A1 | 3/2002 | Todd | |
| 2002/0125012 | A1 | 9/2002 | Dawson et al. | 166/300 |
| 2003/0060374 | A1 | 3/2003 | Cooke, Jr. | 507/200 |
| 2003/0114314 | A1 | 6/2003 | Ballard et al. | 507/100 |
| 2003/0130133 | A1 | 7/2003 | Vallmer | 507/100 |
| 2003/0188766 | A1 | 10/2003 | Banerjee et al. | 134/7 |
| 2003/0234103 | A1 | 12/2003 | Lee et al. | 166/293 |
| 2004/0014607 | A1 | 1/2004 | Sinclair et al. | 507/200 |
| 2004/0040706 | A1 | 3/2004 | Hossaini et al. | 166/278 |
| 2004/0055747 | A1 | 3/2004 | Lee | 166/278 |
| 2004/0094300 | A1 | 5/2004 | Sullivan et al. | 166/308.1 |
| 2004/0106525 | A1 | 6/2004 | Willbert et al. | 507/200 |
| 2004/0138068 | A1 | 7/2004 | Rimmer et al. | 507/100 |
| 2004/0152601 | A1 | 8/2004 | Still et al. | 507/100 |
| 2004/0152602 | A1 | 8/2004 | Boles | 507/100 |
| 2004/0216876 | A1 | 11/2004 | Lee | 166/280.1 |
| 2004/0231845 | A1 | 11/2004 | Cooke, Jr. | 166/279 |
| 2004/0261993 | A1 | 12/2004 | Nguyen | 166/276 |
| 2004/0261995 | A1 | 12/2004 | Nguyen et al. | 166/279 |
| 2004/0261996 | A1 | 12/2004 | Munoz, Jr. et al. | 166/279 |
| 2004/0261999 | A1 | 12/2004 | Nguyen | 166/292 |
| 2005/0006095 | A1 * | 1/2005 | Justus et al. | 166/295 |
| 2005/0028976 | A1 | 2/2005 | Nguyen | 166/276 |
| 2005/0103496 | A1 | 5/2005 | Todd et al. | 166/278 |
| 2005/0252659 | A1 | 11/2005 | Sullivan et al. | 166/280.1 |
| 2005/0272613 | A1 | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 2001/02698 * | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795), undated.

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating*

*Untapped Reserves*, HO2319R, Halliburton Energy Services, 2000.

Halliburton, *CobraJet Frac<sup>SM</sup> Service, Cost-effective Technology That Can Help Reduce Cost Per BOE Produced, Shorten Cycle Time and Reduce Capex*, Halliburton Communications, undated.

Blauch, et al, *Aqueous Trackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842).

M. Ahmad, et al.: "Ortho Ester Hydrolysis: Direct Evidence for a Three-Stage Reaction Mechanism, "Engineering Information Inc., NY, NY, vol. 101, No. 10 (XP-002322843).

Heller, et al., *Poly(ortho esters) For The Pulsed And Continuous Delivery of Peptides And Proteins*, Controlled Release and Biomedical Polymers Department, SRI International, (pp. 39-46), undated.

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society; vol. 32, No. 2, 1999 (pp. 301-307).

Ng, et al., *Synthesis and Erosion Studies of Self-Catalyzed Poly(ortho ester)s*, American Chemical Society, vol. 30 , No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

* cited by examiner

COMPOSITIONS AND METHODS FOR DEGRADING FILTER CAKE

FIELD OF THE INVENTION

The present invention relates to methods and compositions for treating subterranean formations, and more specifically, to improved methods and compositions for degrading filter cake deposited in a subterranean formation.

DESCRIPTION OF THE PRIOR ART

Filter cake, the residue deposited on a permeable medium when servicing fluids contact the medium under a pressure, is formed in a variety of subterranean operations such as drilling, fracturing, and gravel packing. A filter cake is often desirable, at least temporarily, in subterranean operations as it may act to stem the flow of a servicing fluid from its desired location, to the surrounding subterranean formation. For instance, where the servicing fluid is a drilling fluid, a filter cake formed on the wall of the well bore may act to keep the drilling fluid in its desired location, in the annulus between the well bore and the drill pipe, rather than allowing the drilling fluid to leach off into the surrounding formation. Loss of drilling, fracturing, gravel transport and other servicing fluids into the formation represents an increased expense and, if too much fluid is lost, the attendant increase in damage to the producing zones in the formation. Moreover, the presence of a filter cake may add strength and stability to the formation surfaces on which the filter cake forms, as in the case of soft sandstone formations.

Filter cakes may be formed during drilling and fracturing operations. Once a well bore is established, producing zones along the well bore may be treated to increase their permeabilities and/or conductivities. One such production stimulation treatment involves hydraulically fracturing the formation with a viscous treating fluid to create one or more cracks or "fractures." As a fracture is created, a portion of the fluid contained in the viscous fracturing fluid leaks off into the formation and creates a filter cake comprising deposited viscosifying agent and fluid loss control agent on the walls of the fracture and the formation. The filter cake acts as a physical barrier to liquid travel that, as described above, helps reduce fluid loss into the producing zone. The filter cake also presents a barrier to flow of liquid from the zone, thus, after the fracturing operation has been completed, the filter cake generally needs to be removed so that the formation may be placed on production.

Sand control operations, such as gravel packing, are also common after a well bore is drilled. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Often, gravel packs are placed along a well bore having a filter cake on its walls.

While filter cakes may be beneficial, it is generally necessary to remove filter cakes from producing zones once the well is placed into production. One known method for the removal of filter cakes from producing formations involves including an acid-soluble particulate solid bridging agent for bridging over the formation pores in the drilling, fracturing, gravel transport or other servicing fluid that forms the filter cake. Such an acid-soluble filter cake could then be removed by placing a strongly acidic acid solution in contact with the filter cake and allowing that solution to remain in contact for a period of time sufficient to dissolve the filter cake.

One consideration in removing a deposited filter cake from a subterranean well bore formation involves the timing of such removal. For instance, in situations where sand control of the formation is a concern, a filter cake offers some degree of control over unconsolidated particulates in the subterranean formation while placing the gravel pack. For example, if the filter cake is removed prior to gravel packing, the unconsolidated particulates are not controlled and well bore stability problems may arise causing the collapse of the bore hole and preventing the installation of a gravel pack. While installing the screen and placing the gravel before removing the filter cake helps control unconsolidated particulates and maintain bore hole stability, it also makes the filter cake itself more difficult to remove. This is because the screen and gravel represents a physical barrier between the filter cake on walls of the well bore and the acidic fluid used to remove the filer cake.

One conventional method that attempts to overcome that problem involves placing a breaker (e.g., an oxidizer, ester, enzyme, or the like) in the fracturing, transport or other servicing fluid that creates the filter cake in hopes that the breaker will permeate the filter cake and break it down. However, because the breaker is dissolved in the servicing fluid and not all of the servicing fluid remains in the subterranean formation much of the breaker that is used gets circulated out of the well bore and does not interact with the filter cake as desired.

SUMMARY OF THE INVENTION

The present invention relates to methods and compositions for treating subterranean formations, and more specifically, to improved methods and compositions for degrading filter cake deposited on a subterranean formation.

One embodiment of a method of the present invention involves degrading filter cake comprising the steps of providing particulates coated with an acid-releasing degradable material; placing the particulates into a subterranean formation so that they form a pack substantially adjacent to a filter cake; allowing the acid-releasing degradable material to produce acid; and allowing the acid to contact and degrade a portion of the filter cake.

Another embodiment of the present invention involves gravel pack comprising gravel particles coated with an acid-releasing degradable material. Still another embodiment of the present invention involves a proppant pack comprising proppant particles coated with an acid-releasing degradable material.

The objects, features, and advantages of the present invention will be readily apparent to those skilled in the art upon a reading of the description of the preferred embodiments that follows.

DESCRIPTION OF PREFERRED EMBODIMENTS

The present invention relates to methods and compositions for treating subterranean formations, and more specifically, to improved methods and compositions for degrading filter cake deposited on a subterranean formation.

Certain embodiments of the compositions of the present invention comprise particulates coated with an acid-releasing degradable material that releases acid over time. The released acid may be used to degrade an acid-soluble filter cake substantially adjacent to the coated particulates. In some embodiments the acid-releasing degradable material used to coat the particulates acts at a delayed rate to produce acid such that the particles may be placed in the subterranean formation adjacent to the filter cake before a substantial amount of acid is released. The compositions and methods of the present invention are suitable for use in removing any filter cake that degrades in the presence of an acid.

Any particulate material suitable for use in conjunction with subterranean applications is suitable for use as the particulate in the compositions and methods of the present invention. Natural sand, quartz sand, particulate garnet, glass, ground walnut hulls, nylon pellets, bauxite, ceramics, polymeric materials, or the like are all suitable. Suitable sizes range from 4 to 100 U.S. mesh, in certain preferred embodiments the sizes range from 10 to 70 US mesh. The particulate material of the present invention may be used as gravel particles used in sand control operations, as proppant particles used in fracturing operations, or as any other particulate employed in subterranean operations that may be placed substantially adjacent to a filter cake.

Acid-releasing degradable materials that may be used in conjunction with the present invention are those materials that can be coated onto a particulate and that are substantially water insoluble such that they degrade over time, rather than instantaneously, to produce an acid. Examples of suitable acid-releasing degradable materials include substantially water insoluble esters such as ortho esters; poly (orthoesters); aliphatic polyesters; lactides, poly(lactides); glycolides; poly(glycolides); poly($\epsilon$-caprolactone); poly(hydroxybutyrate); substantially water insoluble anhydrides; poly(anhydrides); and poly(amino acids).

Polymers suitable for use as an acid-releasing degradable material of the present invention may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Blends of certain acid-releasing degradable materials may also be suitable. One example of a suitable blend of materials includes a blend of a poly(lactic acid) and lactide. Other materials that undergo degradation and produce acid may also be suitable, if the products of the degradation do not undesirably interfere with either the subterranean treatment being performed or the subterranean formation.

In choosing the appropriate acid-releasing degradable material, one should consider the degradation products that will result. Also, these degradation products should not adversely affect other operations or components. The conditions of the well, e.g., well bore temperature and environmental factors, must also be considered when choosing an acid-releasing degradable material. For instance, polyesters have been found to be suitable for well bore temperatures in the range of 60° F. to 400° F. Generally, smaller molecule acid-releasing degradable materials are suitable for use in lower temperature application and larger molecule acid-releasing degradable materials are suitable for use in higher-temperature applications. It is within the ability of one skilled in the art, with the benefit of this disclosure, to select a suitable acid-releasing degradable material.

When used in the present invention, a preferable result is achieved if the degradable material degrades slowly over time as opposed to instantaneously. Even more preferable results have been obtained when the degradable material does not substantially degrade until after the subterranean treatment, such as a gravel packing or fracturing operation, has been substantially completed.

The acid-releasing degradable material of the present invention may be coated onto particulate material by any means known in the art. In one embodiment, the particles may be coated with the acid-releasing degradable material "on-the-fly." The term "on-the-fly" is used herein to mean that one flowing stream is continuously introduced into another flowing stream so that the streams are combined and mixed while continuing to flow as a single stream as part of the on-going treatment. Such mixing can also be described as "real-time" mixing. One such on-the-fly mixing method would involve continuously conveying the particles and the acid-releasing degradable material to a mixing vessel. Once inside the mixing vessel, the particles would be coated with the acid-releasing degradable material and continuously removed from the mixing vessel. In that situation, a sand screw could be used both to aid in mixing the particulates, be they gravel, proppant, or some other particulate, with the acid-releasing degradable material and to remove the acid-releasing degradable material-coated particles from the mixing tank. As is well understood by those skilled in the art, batch or partial batch mixing may also be used to accomplish such coating.

Where the chosen acid-releasing degradable material is a solid material at ambient temperatures it may be advantageous to mix the acid-releasing degradable material with a solvent to facilitate the coating of the acid-releasing degradable material onto the particulate material. A variety of solvents known in the art are suitable for using the present invention. Some such solvents include, but are not limited to acetone, propylene carbonate, dipropylglycolmethylether, methylene chloride, isopropyl alcohol, and combinations thereof.

In some embodiments of the present invention the particle material, such as gravel in a gravel packing operation or proppant in a fracturing operation, is coated with from about 0.1% to about 20% acid-releasing degradable material by weight of the gravel particles, more preferably from about 0.5% to about 10% acid-releasing degradable material by weight of the gravel particles and most preferably from about 1% to about 8% acid-releasing degradable material by weight of the particulate material. In some embodiments of the present invention, all of the particles used in the subterranean operation are coated with an acid-releasing degradable material of the present invention. In other embodiments, only a portion of the particles is coated. Where the percentage of particles coated is less than 100%, it may be desirable to coat a higher percentage of the acid-releasing degradable material on the coated particles. It is within the ability of one skilled in the art to determine the amount of acid-releasing degradable material that will be necessary to sufficiently degrade the filter cake and to coat enough particles with enough acid-releasing degradable material to achieve that goal.

Where the coated particles of the present invention are used in a sand control operation such as gravel packing, the gravel pack may be formed using any technique known in the art. In one technique, gravel particles at least partially coated with an acid-releasing material are slurried into a delivery fluid and pumped into the well bore having a filter cake deposited thereon and substantially adjacent to the zone of the subterranean formation that has been fitted with a gravel pack screen. The gravel material is separated from the slurry as the delivery fluid is forced into the well bore and through the screen. The gravel particles are not able to flow through the mesh of the screen and are left behind, thus forming a gravel pack. In a gravel pack formed from such coated particles, the acid-releasing degradable material substantially degrades the adjacent filter cake.

Similarly, where the coated particles of the present invention are used in a fracturing operation, the proppant pack formed inside the fracture with the coated particles of the present invention may be formed using any technique known in the art. In one technique, proppant particles at least partially coated with an acid-releasing material are slurried into a fracturing fluid and pumped into a fractured subterranean formation. The proppant particles are then placed in the fracture and form a proppant pact substantially adjacent to walls of the fracture. Once the proppant pack is substantially formed, the acid-releasing degradable material produces a sufficient amount of acid at least to partially degrade the filter cake on the walls of the fracture.

To facilitate a better understanding of the present invention, the following examples of preferred embodiments are given. In no way should the following examples be read to limit the scope of the invention.

EXAMPLES

Polylactic acid was mixed with a methylene chloride solvent to form a solution capable of coating particulate matter. That solution was then mixed in thirds to 267 grams of 20/40 particulate sand and mixed together, after which the solvent was stripped from the coated sand by vacuum action to create free flowing coated sand. The coated sand weighed 273 grams, representing a 2% coating of polylactic acid.

The acid-releasing degradable material-coated gravel particles were then placed in a high-temperature, high-pressure cell against a calcium carbonate filter cake. The cell was set at 200° F. at 500-psi and allowed to soak static for three days following which the filtrate valve on the cell was opened and brine flowed freely. If the filter cake had been intact after the three days, only a slow drip would have flowed from the filtrate valve, even under 500-psi of pressure. Thus, such free flow of brine indicated that the acid-releasing degradable material had successfully broken the filter cake. The cell was then broken down and visual inspection confirmed that the calcium carbonate filter cake had been substantially degraded.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of degrading filter cake in a subterranean formation comprising the steps of:
   providing a particulates coated with an acid-releasing degradable material;
   placing the particulates into a subterranean formation so that they form a pack substantially adjacent to a filter cake;
   allowing the acid-releasing degradable material to produce acid; and
   allowing the acid to contact and degrade a portion of the filter cake.

2. The method of claim 1 wherein the filter cake is a filter cake on the walls of a well bore or a filter cake on the walls of a fracture.

3. The method of claim 1 wherein the particulates are coated with from about 0.1% to about 20% acid-releasing degradable material by weight of the particulates.

4. The method of claim 1 wherein the acid-releasing degradable material comprises a material that is substantially water insoluble and that degrades over time in an aqueous environment.

5. The method of claim 1 wherein the acid-releasing degradable material is chosen from the group consisting of substantially water insoluble esters, orthoesters, poly (orthoesters), aliphatic polyesters, lactides, poly(lactides), glycolides, poly(glycolides), poly($\epsilon$-caprolactones), poly (hydroxybutyrates), substantially water insoluble anhydrides, poly(anhydrides), aliphatic carbonates, polycarbonates, poly(amino acids), polyphosphazenes, and combinations thereof.

6. The method of claim 1 wherein the acid-releasing degradable material further comprises a solvent.

7. The method of claim 6 wherein the solvent is chosen from the group consisting of acetone, propylene carbonate, dipropylglycolmethylether, methylene chloride, isopropyl alcohol, and combinations thereof.

8. A method of using a portion of a gravel pack to degrade a portion of a filter cake comprising the steps of
   providing a gravel pack composition comprising gravel particles coated with an acid-releasing degradable material;
   introducing the gravel pack composition to a well bore having a filter cake so that the gravel pack composition forms a gravel pack substantially adjacent to the filter cake;
   allowing the acid-releasing degradable material to produce acid; and,
   allowing the acid to contact and degrade a portion of the filter cake.

9. The method of claim 8 wherein the gravel pack compositions comprises from about 0.1% to about 20% acid-releasing degradable material by weight of the gravel particles.

10. The method of claim 8 wherein the acid-releasing degradable material comprises a material that is substantially water insoluble such that it degrades over time.

11. The method of claim 8 wherein the acid-releasing degradable material is chosen from the group consisting of substantially water insoluble esters, orthoester, poly(orthoesters), aliphatic polyesters, lactides, poly(lactides), glycolides, poly(glycolides), poly($\epsilon$-caprolactones), poly(hydroxybutyrates), substantially water insoluble anhydrides, poly(anhydrides), aliphatic carbonates, polycarbonates, poly(amino acids), polyphosphazenes, and combinations thereof.

12. The method of claim 8 wherein the acid-releasing degradable material further comprises a solvent.

13. The method of claim 12 wherein the solvent is chosen from the group consisting of acetone, propylene carbonate, dipropylglycolmethylether, methylene chloride, isopropyl alcohol, and combinations thereof.

14. A method of using a portion of a proppant pack to degrade filter cake comprising the steps of:
 providing a proppant pack composition comprising proppant particles coated with an acid-releasing degradable material;
 introducing the proppant pack composition to a fracture so that a proppant pack forms against walls of the fracture wherein a wall of the fracture has a filter cake thereon;
 allowing the acid-releasing degradable material to produce acid; and,
 allowing the acid to contact and degrade a portion of the filter cake.

15. The method of claim 14 wherein the proppant pack composition comprises from about 0.1% to about 20% acid-releasing degradable material by weight of the gravel particles.

16. The method of claim 14 wherein the acid-releasing degradable material comprises a material that is substantially water insoluble such that it degrades over time.

17. The method of claim 14 wherein the acid-releasing degradable material is chosen from the group consisting of substantially water insoluble esters, orthoesters, poly(orthoesters), aliphatic polyesters, lactides, poly(lactides), glycolides, poly(glycolides), poly($\epsilon$-caprolactones), poly(hydroxybutyrates), substantially water insoluble anhydrides, poly(anhydrides), aliphatic carbonates, polycarbonates, poly(amino acids), polyphosphazenes, and combinations thereof.

18. The method of claim 14 wherein the acid-releasing degradable material further comprises a solvent.

19. The method of claim 18 wherein the solvent is chosen from the group consisting of acetone, propylene carbonate, dipropylglycolmethylether, methylene chloride, isopropyl alcohol, and combinations thereof.

* * * * *